United States Patent Office 3,449,955
Patented June 17, 1969

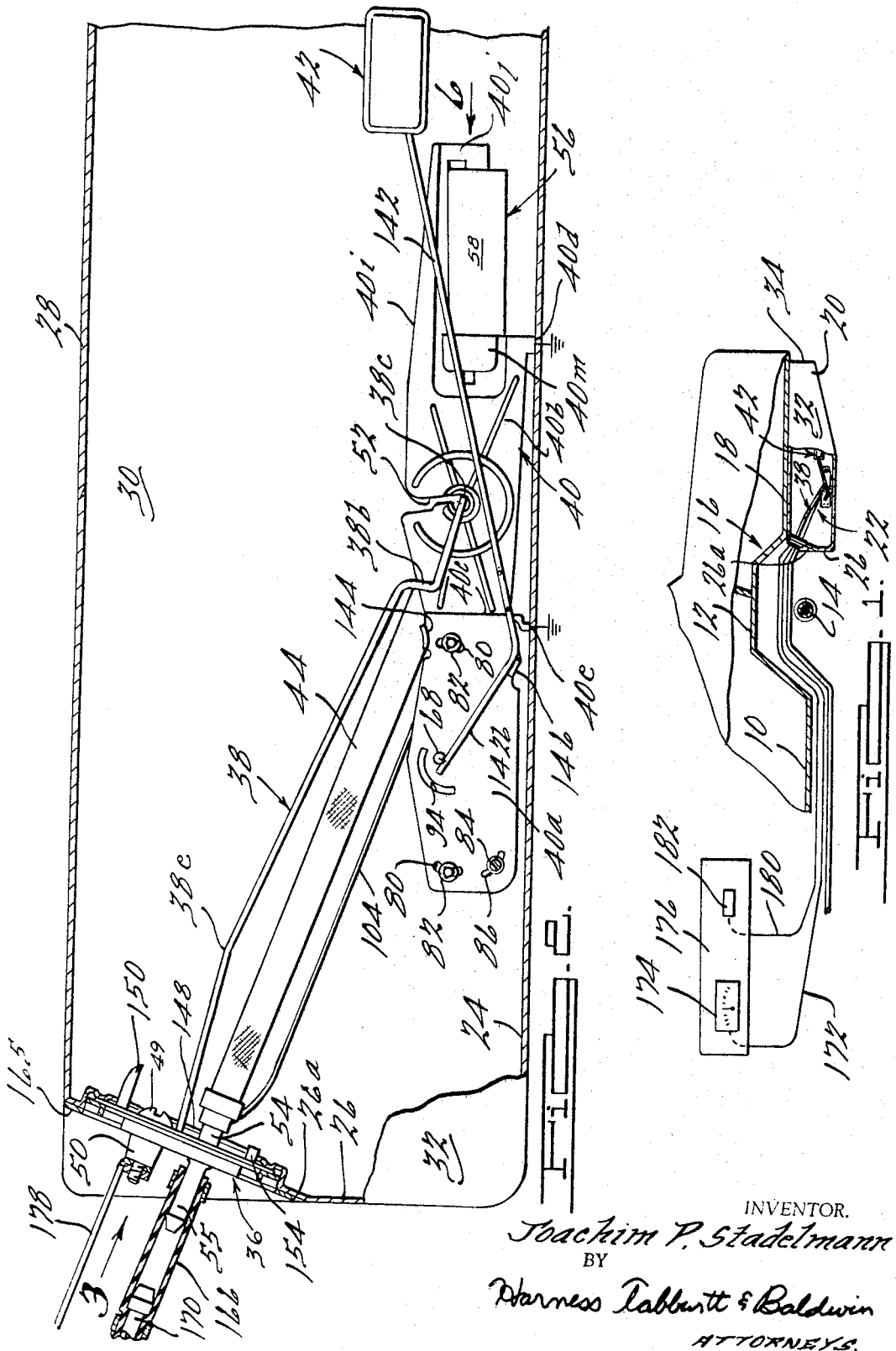

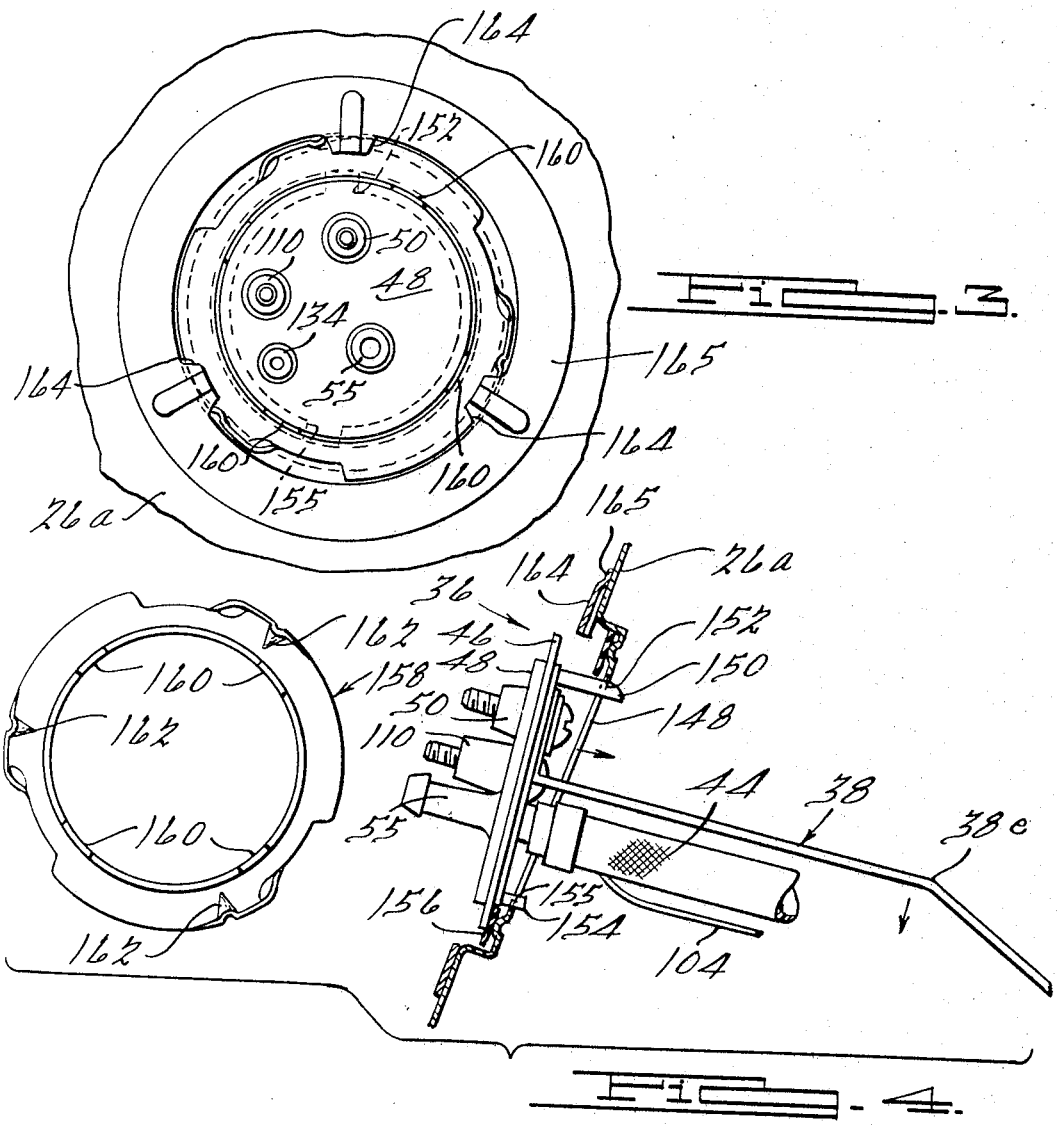

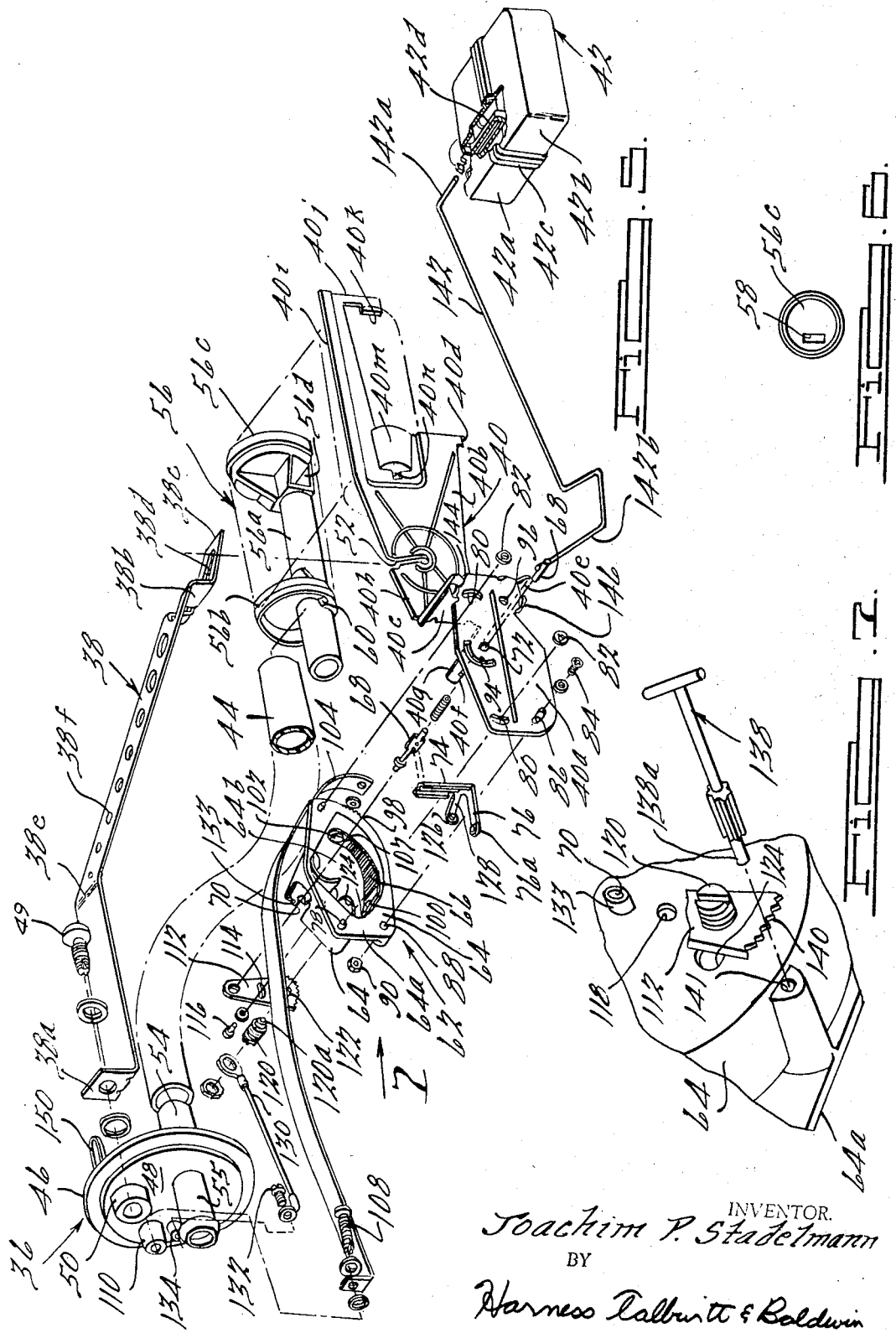

3,449,955
FUEL LEVEL SENDING UNIT
Joachim P. Stadelmann, Madison Heights, Mich., assignor to Chrysler Corporation, Highland Park, Mich., a corporation of Delaware
Filed Mar. 24, 1967, Ser. No. 625,861
Int. Cl. G01f 23/08
U.S. Cl. 73—313                                     14 Claims

ABSTRACT OF THE DISCLOSURE

For use in a motor vehicle fuel tank, a sending unit includes a leaf spring which is fixed at one end to a plug removably positioned in the usual access hole in a side wall of the tank, the spring extending into the tank in cantilever fashion from the plug with the free end of the spring arranged to press resiliently downwardly against a suitable base structure to maintain the base structure in firm engagement with the bottom wall of the tank. The siphon hose and float of the sending unit are mounted on the base structure and are therefore positively and accurately oriented with respect to the tank bottom wall.

A sending unit for a motor vehicle fuel tank wherein the float and gasoline syphon tube are both mounted on a base structure which is pressed firmly against the bottom of the tank by the free end of a leaf spring extending in cantilever fashion from a plug received in an access hole in a side wall of the tank.

---

Background of the invention

This invention relates to fuel level indicating systems for motor vehicles. More particularly, it relates to a unit adapted to be positioned within the fuel tank of a motor vehicle wherein it functions to generate an electrical signal proportionate to the fuel level in the tank and send this signal to a suitable electric gauge or indicator mounted on the instrument panel of the vehicle. These units are commonly, and hereinafter, referred to as "sending units."

Sending units currently in use on most domestically manufactured motor vehicles consist broadly of a plug member adapted to be locked into an access hole in a side or top wall of the tank, a rigid syphon tube rigidly connected to the plug member and extending downwardly therefrom to open at its lower end at a location adjacent the bottom wall of the tank, and a float mounted on or guided by the rigid syphon tube and adapted to ride on the surface of the fuel in the tank to sense the fuel level.

Sending units of this general type are inherently inaccurate since both the syphon tube and the float are oriented or referenced from the top or side of the tank rather than from the bottom of the tank. For example, variations in the top to bottom dimensions of the tanks, occurring as a result of normal and uncontrollable manufacturing tolerances, produce like variations in the distance from the lower end of the syphon tube to the bottom of the tank. The distance from the lower end of the syphon tube to the tank bottom also varies with variations in the angle of the tank wall into which the plug carrying the syphon tube is locked; this distance also varies with variations in the overall length of the syphon tube assembly. Variations in the distance from the lower end of the syphon tube to the tank bottom produce significant—and undesirable—variations in the amount of unusable fuel in the gas tank.

Further, since the float is oriented with respect to the syphon tube—i.e., a given position of the float relative to the syphon tube generates a given electrical signal— variations in the angular disposition of the syphon tube within the tank and variations in the vertical disposition of the syphon tube relative to the tank bottom produce corresponding variations in the signals generated by the float unit for a particular fuel level. As a result—and even assuming that the gauge or indicator receiving the signal from the sending unit is completely accurate—the reading on the fuel gauge is often an inaccurate indication of the amount of fuel remaining in the fuel tank.

The inaccurate orientation of the float mounting relative to the tank bottom also precludes any meaningful preassembly calibration of the sending unit since a preassembly calibration must assume a particular spatial relationship between the float mounting and the tank bottom in the final assembly of the sending unit and the fuel tank.

Summary

A general object of the present invention is to provide an improved sending unit for a motor vehicle fuel tank.

A more specific object is to provide such a sending unit which is more accurate than known units and yet is competitive in cost with known units.

In the sending unit of the present invention, the float member and the syphon tube are mounted on a base structure and means are provided to continuously urge the base structure downwardly into firm engagement with the bottom wall of the tank. The float member and syphon tube are thus positively oriented with respect to the bottom of the tank, thereby substantially eliminating the inaccuracies inherent in prior art units taking their orientation from a portion of the tank remote from the bottom wall.

Specifically, since the lower end of the syphon tube is fixed relative to the base structure and the base structure is fixed relative to the tank bottom, the distance from the lower end of the syphon tube to the tube bottom— and thereby the amount of unusable fuel remaining in the tank below the lower end of the syphon tube—will not vary significantly from tank to tank despite substantial variations in tank dimensions resulting from manufacturing tolerances. Further, since the arrangement of the present invention substantially fixes the location of the float mounting relative to the tank bottom, the signal generated by the sending unit for a particular fuel level in the tank will not vary significantly from tank to tank. For the same reason, the sending unit may be given a meaningful preassembly calibration since the location of the float mounting relative to the tank bottom is established within a small tolerance range.

In the disclosed embodiment, the base structure is pressed against the tank bottom wall by the free end of a leaf spring which extends in cantilever fashion from a plug member received in an access hole in an upper portion of the front wall of the tank.

According to a further feature of the invention, the plug member has a peripheral flange adapted for sealing coaction with sealing means around the access opening in the tank, and the angular relationships of the leaf spring to the plug member, the point of engagement of the spring member with the base structure, and the length of the spring member are selected so that, with the base structure positioned on the bottom of the tank and the plug member positioned generally adjacent the access opening, the peripheral flange of the plug member lies in a plane angularly disposed with respect to the plane of the coacting sealing means around the access opening. Thus, the plug member must be forcibly tilted against the resistance of the leaf spring to bring its flange into a position where it may lockingly coact with the sealing means around the tank opening; this tilting movement loads the leaf spring and causes it to press the base structure downwardly into firm engagement with the bottom of the tank.

Brief description of the drawings

A preferred embodiment of the invention is shown in the accompanying drawings wherein:

FIG. 1 is a fragmentary partially schematic view of a motor vehicle embodying a sending unit according to the invention;

FIG. 2 is a cross-sectional view of the fuel tank of the motor vehicle of FIG. 1 showing details of the sending unit disposed within the fuel tank;

FIG. 3 is a fragmentary view looking in the direction of the arrow 3 in FIG. 2;

FIG. 4 is a fragmentary view of the upper left hand corner of the fuel tank of FIG. 2;

FIG. 5 is an exploded perspective view of the sending unit of the invention;

FIG. 6 is a fragmentary end view looking in the direction of arrow 6 in FIG. 2; and FIG. 7 is a fragmentary perspective view looking in the direction of the arrow 7 in FIG. 5.

Description of the preferred embodiment

The motor vehicle shown fragmentarily and schematically in FIG. 1 includes a floor pan 10, a kick-up 12 clearing a rear axle 14, a luggage compartment 16 having a floor 18, and a fuel tank 20 suitably strapped to the underface of luggage compartment floor 18. The sending unit of the invention is seen generally at 22.

Referring now particularly to FIGS. 2 and 5, fuel tank 18 includes a bottom wall 24, a forward wall 26, an upper wall 28, side walls 30 and 32, and rear wall 34 (FIG. 1). A central upper portion of forward wall 26 is canted rearwardly to provide an angle mounting wall portion 26a. Sending unit 22, broadly considered, includes a plug member 36, a leaf spring member 38, a base structure 40, a float 42, and a syphon hose 44.

Plug member 36 is preferably formed as a molded plastic part. It is generally disc-shaped and includes a circular flange portion 46 and a central main body portion 48.

Leaf spring member 38 is formed of spring steel and extends in cantilever fashion from plug member 36. It is rigidly secured at its upper end to the rear face of plug member 36 by a screw 49 extending through an upwardly angled portion 38a of the spring member. Screw 49 threads into a bore provided by a stud 50 integral with plug member 36. The lower or free end of spring member 38 includes a downwardly angled portion 38b and a tip portion 38c. A slot 38d is provided in tip portion 38c; slot 38d extends through angled portion 38b and into the main body portion of the spring member. Spring member 38 is given a permanent downward set at 38e and is provided with a plurality of holes 38f between set 38e and slot 38d. Holes 38f progressively increase in size in the direction of slot 38d so as to allow the spring member to bow substantially uniformly along its length in response to imposition of a load at the free end of the spring member.

Base structure 40 is formed as a single piece sheet metal stamping and includes a forward portion 40a, a rearward portion 40b and an angled central portion 40c interconnecting forward and rearward portions 40a and 40b. Base structure 40 is adapted to sit on three feet. One foot is provided by a tab 40d at the rearward end of base structure portion 40b. A second foot is provided by a tab 40e adjacent the juncture of base structure portions 40a and 40c, and the third foot is provided by a tab 40f at the free end of a finger 40g formed as a lateral extension of central base portion 40c.

A vertically oriented, upwardly opening slot 52 is provided in base portion 40b. Slot 52 receives the tip end 38c of spring member 38 with section 40h of base portion 40b passing through slot 38d to allow spring member 38 to assume a forwardly extending position generally in alignment with the lengthwise axis of base structure 40. The lower end of slot 52 is circularly enlarged to provide a fulcrum or pivot for spring member 38.

The rearward section of base portion 40b is in the form of a finger 40i bent downwardly at its rearward end to provide a hook 40j terminating in a forwardly extending tip end 40k. Base portion 40b is bulged outwardly at 40m to provide a circular socket.

Hose 44 is of a braided, flexible construction. The upper or forward end of hose 44 is received over, and suitably clamped to, a fitting 54 on the rear face of plug member 36. Fitting 54 communicates through plug member 36 with an aligned fitting 55 on the forward face of the plug member. The lower or rearward end of hose 44 is fitted over and clamped to the forward end of the main body tube portion 56a of a filter body 56. Filter body 56 also includes generally disc-shaped end portions 56b, 56c eccentrically disposed with respect to the axis of tube portion 56a. End portion 56c blocks the rearward end of tube portion 56a but defines a transverse bore 56d communicating with the interior of tube portion 56a.

A tubular filter 58 of known form extends around tube portion 56a and seats at its opposite ends on end portions 56b, 56c. Filter body 56 is mounted on base portion 40b with tip end 40k of hook 40j fitting into a slot 58 (FIG. 6) provided in the rearward face of filter body end portion 56c, end portion 56b nestled in socket 40m, and a prong 40n struck from base portion 40b immediately forwardly of socket 40m received in a socket 60 provided in the forward face of filter body end portion 56b.

A rheostat assembly 62 (FIGS. 5 and 7) is fastened to forward base portion 40a. Rheostat assembly 62 includes a molded housing 64, a resistor card 66 mounted within housing 64, a shaft 68 journalled at one end in a bore 70 in the far wall of housing 64 and journalled at its other end in a bore 72 provided in forward base portion 40a, and a contact arm 74 welded to shaft 68 and including a contact finger 76 having a contact 76a adapted to move selectively along resistor card 66 in response to rotation of shaft 68. Housing 64 is secured to forward base portion 40a by a pair of pins 78 on housing flange portion 64a passing through slots 80 in base member 40a for engagement by push-on nuts 82; in addition, a screw 84 passes through a slot 86 in base portion 40a and through a bore 88 in housing flange portion 64a for engagement with a nut 90. Housing 64 also includes an arcuate bearing portion 64b concentric with the axis of bore 70 and journally received in an arcuate slot 94 in base portion 40a concentric with bore 72. It will be seen that when nuts 82 and 90 are loosened, housing 64 may be rotated relative to base structure 40 on the axis of shaft 68 with the bearing interface being provided by the journalling action of bearing portion 64b is slot 94. This relative rotation of housing 64 may be achieved, for example, by the insertion of a suitable splined tool into access hole 96 in forward base portion 40a for engagement with a plurality of teeth 98 provided on the lower arcuate periphery of housing flange portion 64a.

Resistor card 66 is maintained in its illustrated position within housing 64 by a rivet 100 passing through its forward end and by a rivet 102 passing through its rearward end. Rivet 102 connects to one end of resistor wire 107 and passes through the adjacent wall of housing 64 and thereafter through a suitable opening in one end of a bus strap 104. The other end of bus strap 104 is secured to the rear face of plug member 36 by a screw 108 threadably received in a stud 110 on the plug member.

Rheostat assembly 62 also includes an arm 112 pivoted at its upper end on a boss 133 around journal 70; arm 112 has an arcuate slot 114 intermediate its ends passing a screw 116 for engagement with a threaded bore 118 in the far wall of housing 64 below bore 70. A screw 120 is threadably received in a tapped bore 122 in the lower end of arm 112 and passes through an arcuate slot 124 provided in the far wall of housing 64 immediately below bore 118. The near end 120a of screw 120 constitutes an electrical contact for coaction with an auxiliary contact 126 provided on the free end of a contact finger 128 projecting integrally from contact arm 74. An electrical wire 130 is connected at one end to screw 120 and at its other end to plug member 36 by a screw 132 threaded into a stud 134. It will be seen that, when screw 116 is loosened, arm 112 may be rotated relative to housing 64 about the axis of shaft 68. This rotation may be accomplished, as seen in FIG. 7, by engagement of a suitable splined tool 138 with a plurality of teeth 140 provided as serrations on the lower arcuate end of arm 112 with a pilot portion 138a on the forward end of tool 138 journalling in a pilot hole 141 provided at the lower periphery of housing 64 to preclude translatory movement of tool 138.

Float 42 (best seen in FIG. 5) is a hollow plastic structure consisting of two plastic halves 42a, 42b of generally rectangular cross-section joined together at their interface 42c as by ultrasonic welding. Float half 42a defines a journal 42d. Float 42 is operatively connected to shaft 68 of rheostat assembly 62 by a float arm 142. Arm 142 is in the form of a metallic wire. The forward end of wire 142 is welded to the near end of shaft 68 and the rearward end of wire 142 is cranked to provide a stub arm 142a which is pivotally received in journal 42d of float half 42a.

The upper and lower limits of the pivotal movement of float 42 relative to base structure 40 are established by the engagement of float arm portion 142b with upper and lower stops defined by upper and lower tabs 144, 146 on forward base portion 40a.

*Assembly and operation*

Following assembly of the various parts of the sending unit, the sending unit is calibrated. This is accomplished by placing the sending unit on a horizontal base, hooking up a power supply to screw 108 having a voltage equivalent to the voltage that will be available at the sender in the motor vehicle in which the sender will eventually be employed, and placing a milliammeter in the power supply circuit. A spacer having a height corresponding to a given gasoline supply in the tank (e.g., two gallons) is then placed under float 42 and the rheostat housing 64 is rotated by engagement of teeth 98 with the adjusting tool until a milliammeter reading is obtained corresponding to the signal magnitude necessary to position the needle on the motor vehicle fuel gauge at a desired location corresponding to the amount of fuel left in the tank. For example, if it is desired to have the gauge needle register on the empty increment on the gauge when the fuel level in the tank drops to two gallons, a spacer having a height corresponding to two gallons is placed under the float and the rheostat housing is adjusted to give a signal magnitude corresponding to a needle position on the empty increment.

Another, higher calibrating spacer corresponding to a given, larger gasoline supply (e.g., four gallons) is now placed under the float and arm 112 is rotated by tool 138 until contacts 120a and 126 just close. Closing of contacts 120a and 126 completes a circuit to screw 132. By hooking up a light or other indicator to screw 132, a low fuel warning is provided when the fuel in the tank drops to the level (e.g., four gallons) corresponding to the calibrating spacer.

Sending unit 22 is now inserted into the tank by passing the unit float end first through an access opening 148 (FIGS. 2 and 4) in angled mounting wall 26a. The sending unit is able to pass through the relatively small access opening because of the ability of the leaf spring 38 and attached plug member 36 to pivot about the fulcrum provided by the enlarged lower end of slot 52 to a position generally in longitudinal alignment with base structure 40. Once inside the tank, the base structure is manipulated until its three feet sit firmly on the bottom of the tank and plug member 36 is manipulated to guide an upper, relatively long orienting pin 150 on the rear face of the plug member into an orienting notch 152 on the upper periphery of access opening 148 and guide a lower relatively short orienting pin 154 on the rear face of the plug member into an orienting notch 155 on the lower periphery of access opening 148.

As seen in FIG. 4, with base structure 40 sitting flat on the tank bottom and spring member 38 extending upwardly from base structure 40 in a relaxed configuration, the peripheral flange portion 46 of the plug member lies in a plane which is more nearly vertical than the plane of access opening 148 so that, whereas the lower periphery of flange portion 46 is in contact with a suitable sealing gasket 156 encircling opening 148, the upper periphery of flange portion 46 is substantially spaced from the sealing gasket. Thus, in order to bring flange portion 46 into the plane of the access opening, the plug member must be tilted against the resistance of spring member 38. This tilting of the plug member loads the spring member and causes its free end to press downwardly against base structure 40 to maintain the latter in firm, flat engagement with the bottom wall of the tank. Once the plug member has been tilted into the plane of the access opening, a locking ring 158 (FIGS. 3 and 4) of known form is placed over the plug member and a spanner wrench is applied to engage the fingers 160 on the inner periphery of the locking ring and rotate the ring until a plurality of circumferentially spaced protrusions 162 on the outer periphery of the ring snap into a corresponding plurality of sockets provided by inwardly projecting fingers 164 on a ring 165 welded to mounting wall 126a around opening 148.

The sending unit is now locked in position within the tank with the base structure positively oriented on the bottom of the tank by the continual downward pressure of the loaded spring member. Since the float member and syphon tube are positively mounted on the base structure, they are also positively oriented with respect to the tank bottom.

The tank is now assembled to the lower face of the luggage compartment floor by a plurality of straps (not shown). A short piece of rubber hose 166 (FIG. 2) is clamped at one end over fitting 55 on the plug member; the other end of hose 166 is clamped to the rearward end of fuel line 170. A fuel delivery path is now established through filter 58, transverse bore 56d, main body filter tube portion 56a, hose 44, aligned fittings 54 and 55, hose section 166, and fuel line 170.

A wire 172 is connected at one end to screw 108 and at its other end to one terminal of a current sensitive fuel gauge 174 suitably positioned on the instrument panel 176 of the vehicle. The other terminal of gauge 174 is connected to a voltage limiter of known form and the voltage limiter is in turn connected to the hot side of the car battery. A fuel gauge circuit is thereby established including the car battery, the voltage limiter, fuel gauge 174, wire 172, screw 108, bus strap 104, rivet 102, resistor card wire 107, contact 76a, contact finger 76, contact arm 74, shaft 68, and base member 40. Base member 40 is grounded through the tank by feet 40d, 40e and 40f. A secondary ground is also provided for base member 40 through leaf spring 38, screw 48, and a spanner clip 178 electrically interconnecting screw 48 and fuel line 170.

Another wire 180 is connected at one end to screw 132 and at its other end to one terminal of a suitable low fuel warning device, e.g., a lamp 182 mounted on instrument panel 176. The other side of lamp 182 is connected to the car battery. A warning light circuit is thereby established including the car battery, lamp 182, line 180, screw 132, wire 130, screw 120, contact 120a, contact 126, contact arm 24, shaft 68, and base member 40. Base member 40 is primarily and secondarily grounded as previously described.

In operation, float 42 rides on the surface of the fuel in the tank to sense the fuel level. During a filling operation of the tank, upper stop 144 intercepts the upward movement of float arm 142 to maintain float 42 in a position spaced from upper tank wall 28, whereby to preclude clattering of the float against that wall. As the fuel is drawn off through hose 44 for consumption by the engine, the fuel level gradually recedes and float 42 gradually drops. As float 42 moves downward, shaft 68 is pivoted clockwise to move contact 76a clockwise along resistor card 66 and thereby progressively increase the resistance in the fuel circuit and decrease the magnitude of the current signal sent to the fuel gauge. When float 42 reaches a height corresponding to approximately four gallons remaining in the tank, contact 126 moves into engagement with contact 120a to complete the low fuel warning circuit and ignite warning lamp 182. An antiflicker device (not shown) is preferably included in the low fuel warning circuit to prevent lamp 182 from flickering on and off in response to sloshing of the fuel in the tank as a result of acceleration, deceleration, turning, etc. As the fuel level continues to drop, the needle of the fuel gauge moves progressively lower and reaches the empty increment at such time as the float drops to a height corresponding to approximately two gallons remaining in the tank. If no fuel is added, float 42 continues to drop until float arm portion 142b is engaged by lower stop 146 on base structure 40; the fuel gauge needle at this time is positioned approximately on the "E" mark below the empty increment. If still no fuel is added, the fuel level drops below the level of the now suspended float until it drops below the level of the transverse bore 56d in filter body 56, at which time the car is "out of gas" since the small quantity of fuel remaining in the tank is unusable.

Since the filter body on the end of the syphon hose is positively oriented with respect to the tank bottom, the amount of unusable fuel varies very little from tank to tank despite relatively large variations from tank to tank in the distance of the bottom wall from the top wall and despite relatively large variations in the slope angle of mounting wall 26a.

Further, since the float is positively oriented with respect to the tank bottom, the accuracy of the electrical signal generated by the sending unit is not significantly effected by variations in tank depth and mounting wall angle. In actual comparative tests, the sending unit of the invention has been found to be substantially more accurate than units presently in use. The improvement in accuracy is greatest at the calibration point (e.g., at the two gallon or empty gauge increment level) but is significant at other levels also. The bottom orientation of the float also enables the low fuel warning circuit to provide a much more accurate signal than in previous low fuel warning systems.

While a preferred embodiment of the invention has been illustrated and described in detail, it is to be understood that various changes may be made in the disclosed embodiment without departing from the scope or spirit of the invention.

I claim:

1. A sending unit for use with a motor vehicle fuel tank having a bottom wall and other walls defining with said bottom wall a closed structure; said sending unit including:
   (A) fuel conduit means extending through an opening in one of said other walls and including a fuel conduit member having a free end positioned adjacent said bottom wall to receive fuel from said tank for transmission through said fuel conduit member to the engine of said motor vehicle;
   (B) a float member positioned within said tank and adapted to ride on the surface of the fuel in said tank to sense the fuel level;
   (C) signal means operative to sense the position of said float and generate a signal proportionate to the float position for transmission to the fuel gauge of said vehicle;
   (D) a base structure positioned on said bottom wall;
   (E) means continuously and resiliently urging said base structure downwardly into firm engagement with said bottom wall; and
   (F) means on said base structure mounting at least one of said members on said base structure so as to positively orient that member with reference to said base structure and thereby provide positive orientation of that member with reference to said bottom wall.

2. A sending unit according to claim 1 wherein both of said members are mounted on said base structure.

3. A sending unit for use with a motor vehicle fuel tank having a bottom wall and other walls defining with said bottom wall a closed structure; said sending unit including:
   (A) a base structure positioned on said bottom wall;
   (B) a float movably mounted on said base structure and adapted to ride on the surface of the fuel in said tank to sense the fuel level;
   (C) signal means operative to sense the position of said float and generate a signal proportionate to the float position for transmission to the fuel gauge of said vehicle; and
   (D) means continuously and resiliently urging said base structure downwardly into firm engagement with said bottom wall so as to positively orient said float with reference to said bottom wall.

4. A sending unit according to claim 3 wherein:
   (D) said urging means comprises a leaf spring fixedly extending at one end from one of said other walls of said tank and bearing downwardly at its free end against said base structure.

5. A sending unit according to claim 3 and further including:
   (E) fuel conduit means extending through an opening in one of said other walls and including a fuel conduit member positioned within said tank to receive fuel from said tank for transmission through said fuel conduit member to the engine of said motor vehicle; and
   (F) means on said base structure supporting the free end of said fuel conduit member in a fixed position adjacent said bottom wall to provide a fixed distance from said free end to said bottom wall irrespective of manufacturing tolerances in said tank and/or in the various components of said sending unit.

6. A sending unit according to claim 3 wherein said signal means includes:
   (E) a rheostat mounted on said base structure; and
   (F) means operative in response to movement of said float to selectively control said rheostat.

7. A sending unit according to claim 6 wherein said signal means further includes:
   (G) a first contact carried by said base structure;
   (H) a second contact;
   (I) means operative in response to movement of said float member into a predetermined position relatively near said bottom wall, corresponding to a predetermined amount of fuel remaining in said tank, to bring said contacts into engagement with each other;
   (J) means providing an electrical circuit including said contacts, whereby engagement of said contacts as aforesaid generates an electrical signal for transmission to a suitable low fuel warning device observable by an operator of said vehicle.

8. A sending unit according to claim 6 and further including:
   (G) fuel conduit means extending through an opening in one of said other walls and including a fuel conduit member positioned within said tank to receive fuel from said tank for transmission through said fuel conduit member to the engine of said motor vehicle;

(H) means on said base member supporting said fuel conduit member free end in a fixed position adjacent said bottom wall; and (I) conductor means extending from said rheostat and through said opening for connection to a suitable electrically actuated indicator.

9. A sending unit according to claim 3 wherein said signal means includes:

(E) a rheostat assembly mounted on said base structure and including:
  (1) a resistor member, and
  (2) a contact member adapted to move selectively along said resistor member;

(F) means interconnecting said float and one of said rheostat members and operative in response to movement of said float to move said one rheostat member relative to said other rheostat member; and (G) means mounting said other member for movement relative to said base structure, whereby to allow calibrating adjustment of said rheostat members at a particular fixed float position.

10. A sending unit according to claim 9 wherein said one rheostat member is said contact member, whereby said resistor member is moved relative to said base structure to effect the calibrating adjustment.

11. A sending unit for use with a motor vehicle fuel tank having a bottom wall and other walls forming with said bottom wall a closed structure, said sending unit being adapted to be inserted into said tank through an opening in one of said other walls and comprising:

(A) a base structure adapted to be positioned within said tank on said bottom wall;

(B) a plug member adapted to close said opening and having a peripheral flange adapted for sealing co-acting with sealing means around said opening; and (C) a leaf spring rigidly connected at one end to said plug member and extending therefrom in cantilever fashion for engagement at its free end with said base structure;

(D) the angular relationship of said leaf spring member to said plug member, the point of engagement of said leaf spring member with said base structure, and the length of said leaf spring member being selected so that, with said base structure positioned on said bottom wall and said plug member positioned generally adjacent said opening, said peripheral flange lies in a plane angularly disposed with respect to the plane of the aforesaid sealing means around said opening so that said plug member must be forcibly tilted against the resistance of said leaf spring to bring said flange into a position where it may lockingly coact with the sealing means around said opening, whereby to load said spring and cause it to press said base structure downwardly into firm engagement with said bottom wall.

12. A sending unit according to claim 11 and further including:

(E) a flexible hose secured at one end to said plug member and extending therefrom into said tank; and (F) means on said base structure engaging said hose adjacent its free end to maintain its free end in a fixed position adjacent said bottom wall.

13. A sending unit according to claim 11 and further including:

(E) a float member movably mounted on said base structure and adapted to ride on the surface of the fuel in said tank to sense the fuel level;

(F) a rheostat mounted on said base structure;

(G) means operative in response to movement of said float member to selectively control said rheostat; and (H) conductor means extending from said rheostat to a terminal provided on said plug member, whereby to provide an electrical signal at said plug member proportionate to the fuel level in said tank.

14. A sending unit according to claim 13 wherein:

(I) said rheostat includes:
  (1) a resistance member,
  (2) a fixed contact on said base structure,
  (3) an arm member having a contact movable selectively along said resistance member in response to movement of said float member, and
  (4) another contact on said arm member movable into contact with said fixed contact upon arrival of said float member at a predetermined position relatively near the bottom wall of said tank; and (J) said sending unit further includes conductor means extending from said fixed contact to another terminal on said plug member, whereby to provide an electrical signal at said plug member for use in actuating a suitable low fuel warning indicator.

References Cited

UNITED STATES PATENTS

| | | | |
|---|---|---|---|
| 1,332,276 | 3/1920 | Weaver | 73—306 |
| 1,886,304 | 11/1932 | Rathbone et al. | 116—118 |
| 2,738,674 | 3/1956 | Perkins | 73—313 |
| 3,200,646 | 8/1965 | Donko et al. | 73—313 X |
| 3,208,281 | 9/1965 | Kalmus et al. | 73—313 |
| 3,252,679 | 5/1966 | Bell | 248—361 X |
| 3,348,413 | 10/1967 | Zimmerle | 73—313 |

FOREIGN PATENTS

| | | |
|---|---|---|
| 1,389,934 | 1/1965 | France. |
| 451,134 | 5/1936 | Great Britain. |

LOUIS R. PRINCE, *Primary Examiner.*

D. M. YASICH, *Assistant Examiner.*

U.S. Cl. X.R.

73—317; 248—361